(12) United States Patent
Hayashi

(10) Patent No.: US 6,395,365 B1
(45) Date of Patent: May 28, 2002

(54) OPTICAL RECORDING MEDIUM

(75) Inventor: Kozaburo Hayashi, Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 70 days.

(21) Appl. No.: 09/657,914

(22) Filed: Sep. 8, 2000

(30) Foreign Application Priority Data

Sep. 24, 1999 (JP) .......................................... 11-270174

(51) Int. Cl.$^7$ ................................................ B32B 3/02
(52) U.S. Cl. ..................................... 428/64.1; 428/65.1
(58) Field of Search .............................. 428/64.1, 64.4, 428/65.1, 945; 430/270.11, 495.1, 945; 369/283, 288

(56) References Cited

U.S. PATENT DOCUMENTS 5,663,211 A   9/1997  Kominami et al.

2001/0017819 A1 *  8/2001  Shoji ............................. 369/1
2001/0050140 A1 * 12/2001  Kitsunai ..................... 156/329

FOREIGN PATENT DOCUMENTS

| EP | 0123223 A | 10/1998 |
| JP | 02006562 A | 1/1990 |
| JP | 04288312 A | 10/1992 |
| JP | A-7-70472 | 3/1995 |
| JP | 07330836 A | 12/1995 |
| WO | WO 9858373 A | 12/1998 |

* cited by examiner

Primary Examiner—Elizabeth Evans
(74) Attorney, Agent, or Firm—Oliff & Berridge, PLC

(57) ABSTRACT

An optical recording medium comprises a substrate, a recording film formed on the substrate, and a protective film formed by applying and curing a protective film forming composition on the recording film, wherein the protective film forming composition comprises 60 to 85 wt % of trimethylolpropane triacrylate modified with ethylene oxide, and 25 to 65 parts by weight of tripropyleneglycol diacrylate per 100 parts by weight of the trimethylolpropane triacrylate modified with ethylene oxide.

2 Claims, 1 Drawing Sheet

OPTICAL RECORDING MEDIUM

BACKGROUND OD THE INVENTION

1. Field of the Invention

The present invention relates to an optical recording medium having a protective film, which is suitable for high-speed reproduction.

2. Description of the Related Art

Ordinary optical recording media have a structure in which a recording film (reflecting film) 3 is formed on a transparent substrate 2 made of, for example, polycarbonate, and a protective film 4 of about 10 μm thickness for protecting the recording film 3 is formed, as shown in FIG. 1.

Here, the protective film 4 is made by applying a protective film forming composition containing an acrylate-type monomer on the recording film 3, and curing it.

For such an acrylate-type monomer, it has been suggested to use a combination of 30 to 60 parts by weight of trifunctional (meth)acrylate ester monomer with low skin irritation (primary irritation index) PII of two or less and with a high transparency of the resulting polymer (for example, a trimethylolpropane triacrylate modified with ethylene oxide), 20 to 50 parts by weight of bifunctional (meth)acrylate ester monomer with a PII of two or less and with which the high liquid viscosity of the modified triacrylate can be adjusted to a viscosity that is suitable for application (for example, hydroxypivalic acid neopentylglycol diacrylate), 5 to 25 parts by weight of a monofunctional (meth)acrylate ester monomer (for example, phenoxyethylacrylate, and 0.01 to 1.0 parts by weight of bifunctional dimethylsiloxane, and 5 to 15 parts by weight of a photoinitiator (Japanese Patent Application Laid-Open No. H7-70472).

Recently, such optical recording media are used not only as audio media, but also as video media, so that they are required to adapt to higher reproduction speeds.

Furthermore, since they are used under rather harsh conditions (for example, in a vehicle at high temperature and humidity in summer), higher durability is required from the optical recording medium.

However, when the speed for reading recorded information is increased in an optical recording media having a protective film made by curing a component including mainly trimethylolpropane triacrylate modified with ethylene oxide with low skin irritation as disclosed in Japanese Patent Application Laid-Open No. H7-70472, there is the problem that the recording signal cannot be reproduced correctly, and errors occur. Moreover, there is the problem that the error frequency increases when the optical recording medium is subjected to high temperatures or high humidities.

SUMMARY OF THE INVENTION

It is an object of the present invention to solve the problems of the related art, and to provide an optical recording medium having a protective film made of a protective film forming composition with low skin irritation and small occurrence of errors.

The inventor has found out that for the protective film forming composition for forming the protective film of the optical recording medium, a low level of skin irritation of the entire composition can be maintained by simultaneously using trimethylolpropane triacrylate modified with ethylene oxide (abbreviated as "EO-modified TMPTA" in the following), which has low skin irritation, and tripropyleneglycol diacrylate (abbreviated as "TPGDA" in the following), and that by combining these at a specified proportion, faster reproduction of the optical recording medium is possible as well as the suppression of errors after subjecting the optical recording medium to high temperatures and humidities, thus conceiving of the present invention.

That is to say, the present invention provides an optical recording medium comprising a substrate, a recording film formed on the substrate, and a protective film formed by applying and curing a protective film forming composition on the recording film, wherein the protective film forming composition comprises 60 to 85 wt % of trimethylolpropane triacrylate modified with ethylene oxide, and 25 to 65 parts by weight of tripropyleneglycol diacrylate per 100 parts by weight of the trimethylolpropane triacrylate modified with ethylene oxide.

DETAILED DESCRIPTION OF THE INVENTION

Figure 1:
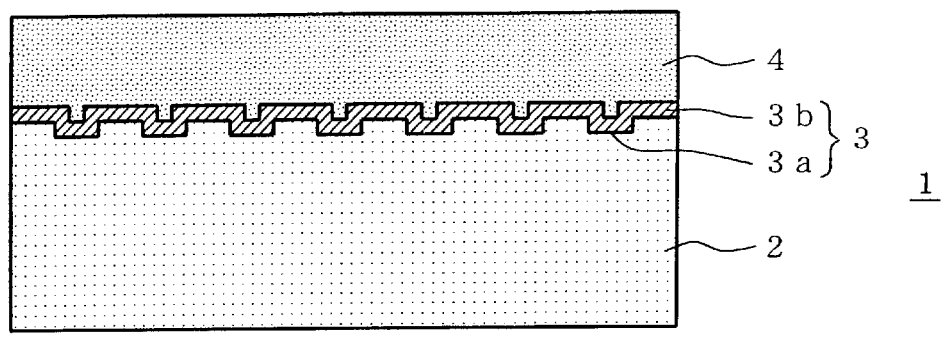
FIG. 1 is a schematic diagram of an optical recording medium.

The following is a detailed description of an optical recording medium of the present invention, with reference to FIG. 1.

An optical recording medium 1 in accordance with the present invention includes a substrate 2, a recording film 3 formed on the substrate 2, and a protective film 4 formed on the recording film 3.

The substrate 2 functions as the support of the optical recording medium 1. To be specific, with regard to ensuring a certain mechanical strength and transparency, it is preferable to use a transparent plastic plate made of polycarbonate or the like for the substrate 2.

Typically, the thickness of the substrate 2 is 1.2 mm.

The recording film 3 is a film for recording information signals and includes pits (concave and convex portions) 3a formed on the surface of the substrate 2 and corresponding to the recording signal, and an light reflecting film 3b made of a metal deposition film of, for example, aluminum formed on those pits 3a. Here, the pits 3a can be formed using any of the well-known methods, such as by photolithography on the substrate 2. Also the light reflecting film 3b can be made using any of the well-known methods, such as by vapor deposition of a metal such as aluminum. When aluminum is used, the thickness of the light reflecting film 3b is ordinarily in the range of 30 nm to 100 nm.

The protective film 4 is formed for protecting the recording film 3 and, in the present invention, is a coating film made by polymerizing and curing an application film of a protective film forming composition containing EO-modified TMPTA and TPGDA by irradiation of energy rays such as UV light.

Here, EO-modified TMPTA is used as the base monomer of the protective film forming composition. It is preferable that the EO modification amount is the modification amount attained by adding 1 to 3 mol of ethylene oxide (EO) per 1 mol of TMPTA. Within this range, it is preferable to add 3 mol of EO per 1 mol of TMPTA, because then the PII of the modified TMPTA is 1.0 and thus very low, and the skin irritation of the entire protective film forming composition can be suppressed to a very low level.

For the EO-modified TMPTA used in the present invention, it is possible to use a commercially available product, for example SR454 (by Sartomer, Co.) or A-TMPA-3EO (by Shin-Nakamura Kagaku, K. K.).

TPGDA, on the other hand, is a monomer for reducing the liquid viscosity of the entire protective film forming composition by diluting the EO-modified TMPTA, which is the base monomer of the protective film forming composition, and the PII of the TPGDA itself is low (1.4).

For the TPGDA. used in the present invention, it is possible to use a commercially available product, for example R306 (by Sartomer Co.) or APG-200 (by Shin-Nakamura Chemical Co., Ltd.).

The amount of EO-modified TMPTA contained in the protective film forming composition for forming the protective film 4 is 60 to 85 wt %, preferably 65 to 75 wt %.

Figure 2:
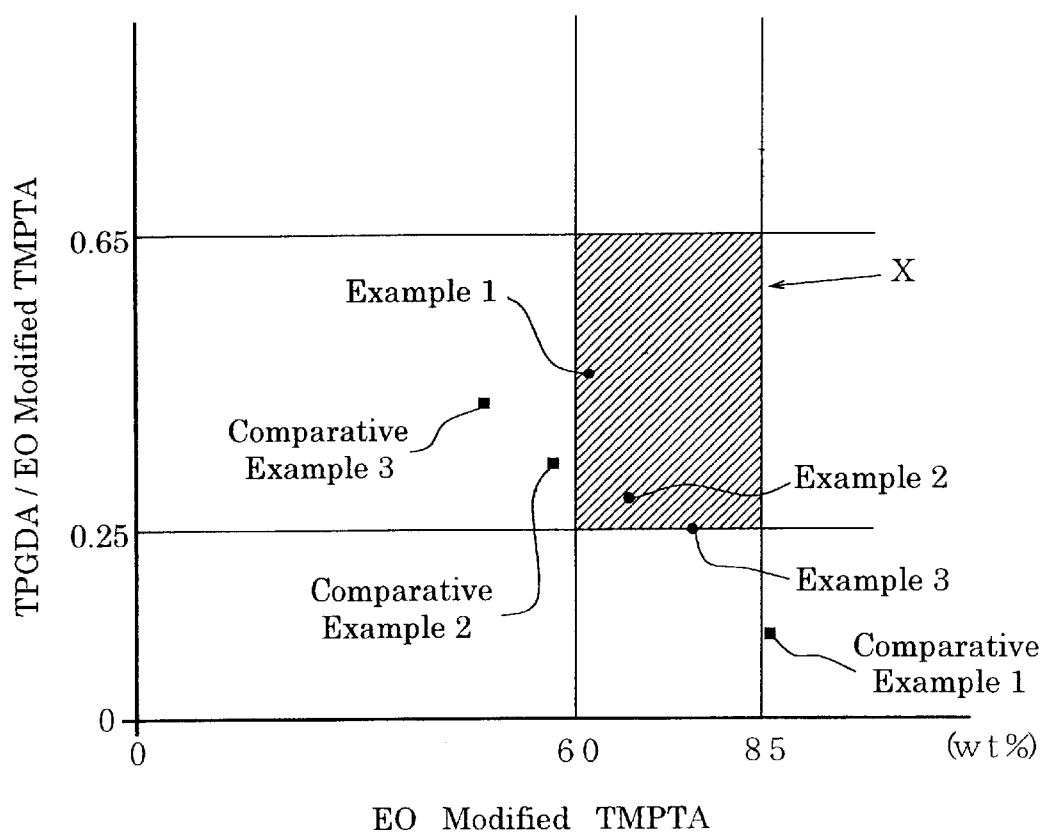
FIG. 2 is a diagram illustrating the range of mixture of the EO-modified TMPTA (A) and TPGDA (B).

On the other hand, the amount of TPGDA used is 25 to 65 parts by weight, and preferably 30 to 50 parts by weight with respect to 100 parts by weight of the EO-modified TMPTA. These ranges are illustrated in FIG. 2. That is to say, in the present invention, it is necessary to set the blending amounts of the EO-modified TMPTA and TPGDA such that they fall into the hatched region X in FIG. 2. The reason for this is that if they are outside the region X, the error frequency after subjecting the optical recording medium to high temperatures and humidities becomes very large.

In the present invention, it is also possible to add other monomers beside the EO-modified TMPTA and the TPGDA to the protective film forming composition. Examples for such other monomers include propyleneoxide-modified trimethylolpropanetriacrylate, neopentylglycol diacrylate, ethyleneoxide-modified bisphenol A-type epoxydiacrylate, and 2-phenoxyethylacrylate.

Furthermore, in the present invention, it is also possible to add other additives to the protective film forming composition, such as a photoinitiator, a surfactant, a leveling agent, etc.

Suitable photoinitiators include benzoin-type photoinitiators such as benzoin, benzoinalkylether, and benzildimetylketal, benzophenone-type photoinitiators such as benzophenone, 4-phenylbenzophenone, and hydroxybenzophenone, and acetophenon-type photoinitiators such as diethoxyacetophenone, 2-hydroxy-2-methyl-1-phenylpropan-1-one.

In the present invention, the protective film 4 can be formed on the recording film 3 with one of the regular methods. That is to say, it is possible to mix predetermined amounts of EO-modified TMPTA, TPGDA and other components that are added as necessary with a stirrer, then apply this mixture to a certain thickness (normally 10 μm) on the recording film 3 by, for example, spin-coating and screen printing, and perform polymerization/curing by irradiation of energy rays, such as UV light.

The optical recording medium in accordance with the present invention as explained above can be used suitably as an optical disk, optomagnetical disk, or the like.

EXAMPLES

The following is an explanation of specific examples of the present invention.

Examples 1 to 3 and Comparative Examples 1 to 3

Preparation of the composition for forming the protective film of the optical recording medium The protective film forming composition is prepared by sufficiently mixing the components shown in Tables 1 and 2 with a stirrer.

The PII values of the used monomers and the PII values of the protective film forming composition (estimated value attained by adding the PII values of the monomers and their wt %) are listed in Tables 1 and 2. Here, when the PII value of the protective film forming composition is less than 2.0, the skin irritation is low and rated "weak", when the PII value is at least 2.0 and less than 6.0, it is rated "medium", and when the PII value is at least 6.0 and less then 9.0, it is rated "intense".

Manufacture of the Optical Recording Medium

Pits (concave and convex portions) corresponding to the recording signals were formed on the surface of a 1.2 mm thick polycarbonate substrate. Then, the recording film was formed by vapor depositing 50 nm of aluminum on these pits. On this recording film, the afore-mentioned protective film forming composition was applied by spin-coating, so that its thickness was 10 μm after curing. Then, a polymerization reaction was initiated by irradiating UV light at an energy density of 200 mj/cm$^2$ from the side to which the film had been applied, and the protective film was formed by waiting (ca. 1 hour) until the reaction is finished. Thus, optical recording media of the Examples 1 to 3 and the Comparative Examples 1 to 3 having the structure shown in FIG. 1 were obtained.

Evaluation of the Occurrence of Errors

The occurrence of errors was evaluated before and after aging the optical recording media of Examples 1 to 3 and Comparative Examples 1 to 3 as explained below. The obtained results are shown in Tables 1 and 2. It is preferable that the number of errors is low, and in practice, 25 or less are preferable.

Before the Aging

The number of errors of the optical recording medium was measured with an error rate measuring device (DR-3755 by Kenwood Corp.). The rotation speed of the disk during the measurement was set to the regular speed mode (ca. 4.3 M/sec) and the quadruple speed mode (ca. 17.2 M/sec).

After the Aging

Then, the same measurement as above was performed after subjecting the optical recording media to 80° C. and 85% for 500 hours (so-called aging process).

TABLE 1

| | component | trade-name | PII value | Examples (parts by weight) 1 | 2 | 3 |
|---|---|---|---|---|---|---|
| A) | EO-modified TMPTA | SR454 | 1.0 | 65<br>62 wt % | 70<br>67 wt % | 80<br>76 wt % |
| B) | TPGDA | SR306 | 1.4 | 30 | 20 | 20 |
| | (B) / (A) | — | — | 0.46 | 0.29 | 0.25 |
| C) | PO-modified TMPTA | SR492 | 1.1 | — | 10 | — |
| | 2-phenoxyethyl-acrylate | SR339 | 1.5 | — | — | — |
| | neopenthyl-glycol-diacrylate | SR351 | 5.0 | 5 | — | — |
| D) | 2-hydroxy-2-methyl-1-phenyl-propan-1-one | Darocure 1173 | — | 5 | 5 | 5 |
| E) | surfactant | FC430 | — | 0.01 | 0.01 | 0.01 |
| skin irritation estimated PII value (evaluation) | | | | ca. 1.3 (weak) | ca. 1.3 (weak) | ca. 1.3 (weak) |
| number of | before aging | regular speed mode | | 10 | 6 | 12 |

TABLE 1-continued

| component | trade-name | PII value | Examples (parts by weight) | | |
|---|---|---|---|---|---|
| | | | 1 | 2 | 3 |
| errors | | quadruple speed mode | 12 | 16 | 14 |
| after aging | | regular speed mode | 13 | 8 | 14 |
| | | quadruple speed mode | 20 | 20 | 16 |

TABLE 2

| | component | trade-name | PII value | Comparative Examples (parts by weight) | | |
|---|---|---|---|---|---|---|
| | | | | 1 | 2 | 3 |
| A) | PO-modified TMPTA | SR454 | 1.0 | 90<br>86 wt % | 60<br>57 wt % | 50<br>48 wt % |
| B) | TPGDA | SR306 | 1.4 | 10 | 20 | 20 |
| | (B) / (A) | — | — | 0.11 | 0.33 | 0.40 |
| C) | PO-modified TMPTA | SR492 | 1.1 | — | — | 20 |
| | 2-phenoxyethyl-acrylate | SR339 | 1.5 | — | 20 | 10 |
| | Neopenthyl-glycol diacrylate | SR351 | 5.0 | — | — | — |
| D) | 2-hydroxy-2-methyl-1-phenylpropan-1-on | Darocure 117 | — | 5 | 5 | 5 |
| E) | surfactant | FC430 | — | 0.01 | 0.01 | 0.01 |
| skin irritation estimated (evaluation) | | PII value | | ca. 1.2 (weak) | ca. 1.4 (weak) | ca. 1.3 (weak) |
| number of errors | before aging | regular speed mode | | 10 | 9 | 6 |
| | | quadruple speed mode | | 20 | 12 | 9 |
| | after aging | regular speed mode | | 16 | 14 | 13 |
| | | quadruple speed mode | | 155 | 30 | 74 |

CONCLUSIONS

As becomes clear from Tables 1 and 2 and FIG. 2, the skin irritation of the protective film forming composition used in the optical recording medium of Examples 1 to 3 is at a low level, and the mixed amounts of EO-modified TMPTA and TPGDA in the protective film forming composition fall into the hatched region X in FIG. 2. Consequently, the number of errors of the optical recording media of Examples 1 to 3 at the regular speed mode and at the quadruple speed mode is less than 25, and it can be seen that it poses no problems in practice.

On the other hand, the skin irritation of the protective film forming composition used in the optical recording media of the Comparative Examples 1 to 3 is at a low level, but the mixed amounts of EO-modified TMPTA and TPGDA in the protective film forming composition fall outside the hatched region X in FIG. 2. Consequently, when the optical recording media of the Comparative Examples 1 to 3 are aged, the error number in the quadruple speed mode increases, and it can be seen that these optical recording media are not suitable for high speed reproduction.

Because a protective film forming composition including certain monomer components with low PII values at a certain proportion is used for forming the protective film of the optical recording medium of the present invention, its skin irritation is low, it can be easily handled by operators, and the protective film can be formed easily by application on the recording film. Moreover, the error frequency at high speed read-out is low, so that it is suitable for the field of optical recording media with larger recording capacities. Furthermore, the error frequency is low even after subjecting the optical recording medium of the present invention to high temperatures and high humidities, so that it is particularly suitable for usage in vehicles.

The entire disclosure of the specification, claims, summary and drawings of Japanese Patent Application No. 11-270174 filed on Sep. 24, 1999 is hereby incorporated by reference.

What is claimed is:

1. An optical recording medium, comprising a substrate, a recording film formed on the substrate, and a protective film formed by applying and curing a protective film forming composition on the recording film, wherein the protective film forming composition comprises 60 to 85 wt % of trimethylolpropane triacrylate modified with ethylene oxide, and 25 to 65 parts by weight of tripropyleneglycol diacrylate per 100 parts by weight of the trimethylolpropane triacrylate modified with ethylene oxide.

2. The optical recording medium according to claim 1, wherein the EO modification amount of trimethylolpropane triacrylate modified with ethylene oxide is the modification amount attained by adding 1 to 3 mol of ethylene oxide per 1 mol of trimethylolpropane triacrylate.

* * * * *